United States Patent
Hall et al.

(10) Patent No.: US 9,424,047 B2
(45) Date of Patent: Aug. 23, 2016

(54) SYSTEM AND METHODS FOR AN IN-VEHICLE COMPUTING SYSTEM

(71) Applicant: Harman International Industries, Incorporated, Stamford, CT (US)

(72) Inventors: Israel Hall, South Lyon, MI (US); David Baker, Northville, MI (US); Steven Edward Montealegre, Mary Esther, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 205 days.

(21) Appl. No.: 14/451,278

(22) Filed: Aug. 4, 2014

(65) Prior Publication Data
US 2015/0039877 A1 Feb. 5, 2015

Related U.S. Application Data

(60) Provisional application No. 61/862,461, filed on Aug. 5, 2013.

(51) Int. Cl.
*G06F 1/00* (2006.01)
*G06F 9/00* (2006.01)
*G06F 9/44* (2006.01)
*G06F 1/32* (2006.01)

(52) U.S. Cl.
CPC .............. *G06F 9/4401* (2013.01); *G06F 1/32* (2013.01); *G06F 9/4418* (2013.01)

(58) Field of Classification Search
CPC ........ G06F 1/32; G06F 9/4401; G06F 9/4418
USPC ...................................................... 713/1, 300
See application file for complete search history.

(56) References Cited

U.S. PATENT DOCUMENTS

| 7,149,889 | B2 * | 12/2006 | Stalker | G06F 11/1441 348/E5.006 |
| 7,188,239 | B2 * | 3/2007 | Funayama | G06F 1/3203 713/1 |
| 7,792,940 | B2 * | 9/2010 | Liao | G06F 9/4416 370/351 |
| 8,655,541 | B2 * | 2/2014 | You | H04L 67/34 340/438 |
| 2004/0102216 | A1 * | 5/2004 | Rosebrock | B60R 16/0315 455/556.1 |
| 2009/0077367 | A1 * | 3/2009 | Bernardini | G06F 9/4418 713/2 |

* cited by examiner

*Primary Examiner* — Mark Connolly
(74) *Attorney, Agent, or Firm* — Alleman Hall McCoy Russell & Tuttle LLP

(57) ABSTRACT

Embodiments are disclosed for controlling power modes of a computing system. In some embodiments, a method for an in-vehicle computing system includes, while the vehicle is shut down, operating the system in a suspend mode with volatile memory on standby, and determining whether a reboot may be completed before a next anticipated vehicle start. The method may further include, if it is determined that a reboot may be completed before the next anticipated vehicle start, performing a reboot of the system.

20 Claims, 6 Drawing Sheets

SYSTEM AND METHODS FOR AN IN-VEHICLE COMPUTING SYSTEM

CROSS-REFERENCE TO RELATED APPLICATION

The present application claims priority to U.S. Provisional Application No. 61/862,461 filed on Aug. 5, 2013, which is hereby incorporated by reference in its entirety for all purposes.

FIELD

The disclosure relates to an in-vehicle computing system such as an infotainment system, and control of power modes of the in-vehicle computing system to improve system performance without compromising user access to the system.

BACKGROUND

Vehicles may include infotainment systems (e.g., an in-vehicle computing system) that provide information and media to vehicle users while serving as a control interface for vehicle systems such as a climate control system, radio, cell phone, etc. as well as for external devices such as mobile phones. For example, an in-vehicle computing system may interface with a speaker system of a vehicle to play media content, conduct phone calls for a user, and provide information to the user, among other features. The in-vehicle computing system may provide information regarding weather, traffic, driving directions/navigation, vehicle diagnostics, etc. The information and media provided to the user may be stored in the infotainment system, received by the infotainment system from other sources (such as a broadcasted radio or television program), or may be generated by the infotainment system based on certain input data such as time of the day, current location, etc. (similar to operation of a portable navigation device). The information may be provided to the user in acoustic form, visual form, or a combination thereof.

SUMMARY

Embodiments are disclosed for controlling power modes of an in-vehicle computing system. In some embodiments, a method for an in-vehicle computing system may include, while the vehicle is shut down, operating the system in a suspend mode with volatile memory on standby, determining whether a reboot may be completed before a next anticipated vehicle start, and if it is determined that a reboot may be completed before the next anticipated vehicle start, performing a reboot of the system.

Embodiments of a vehicle system for providing power mode control may include an in-vehicle computing system having a first processor and a second processor, the first processor executing an operating system and the second processor interfacing with a vehicle control system; and computer readable memory storing instructions executable by the first processor to operate the in-vehicle computing system in a suspend mode with volatile memory on standby while the vehicle is shut down. The instructions may be further executable to determine whether a reboot is completable before a selected event, and if it is determined that a reboot is completable before the selected event, performing a reboot of the in-vehicle computing system.

Another example of a method of controlling power modes of an in-vehicle computing system includes, in response to initiation of a vehicle shut down, suspending operation of the infotainment system while maintaining volatile memory on standby, and after the vehicle is fully shut down and while it remains off, selectively rebooting the infotainment system based on one or more vehicle state parameters.

BRIEF DESCRIPTION OF THE DRAWINGS

The disclosure may be better understood from reading the following description of non-limiting embodiments, with reference to the attached drawings, wherein below.

DETAILED DESCRIPTION

As infotainment systems may use operating systems and/or software similar to those used in a personal computer (PC), a lag may be experienced between the time a vehicle user starts up the vehicle and the time the infotainment system has fully loaded such that its functions are accessible to a user. The user may expect the system to provide a desired level of functionality immediately, such as access to driving directions, playing of media content, etc. Accordingly, it may be undesirable for the in-vehicle computing system to be in a fully unpowered state prior to vehicle start up, as it may take a relatively long time (e.g., tens of seconds) for the system to achieve an acceptable level of functionality when powered on from the fully unpowered state, depending on the operating system used by the in-vehicle computing system. However, if certain system components such as volatile memory are kept in a standby or suspend mode at all times to reduce lag times when the vehicle is started, errors which would otherwise be remedied via reboot of the system may accumulate and impede system performance.

The present disclosure provides an in-vehicle computing system that may be kept in a suspend mode when the vehicle is not in operation. The suspend mode of the in-vehicle computing system may be a mode in which the processor, audio interfaces, and display of the system are in an off state while at least some volatile memory remains in a last known state, which may decrease the time it takes for the system to achieve an acceptable level of functionality when the vehicle is started. However, as keeping volatile memory active may lead to accumulation of errors over time, the in-vehicle computing system may be configured to refresh the volatile memory by performing a reboot (e.g., "cold boot") of the system, for example when the vehicle system is shut down and at a time when use of the vehicle is not likely imminent. After the volatile memory has been refreshed, the in-vehicle computing system may be placed in the suspend mode and quickly restored to an acceptable level of functionality at the next vehicle start. Therefore, the cold boot of the system may be timed to be performed when the vehicle is not in use, such that volatile memory may be refreshed without inconveniencing the user.

Figure 1:
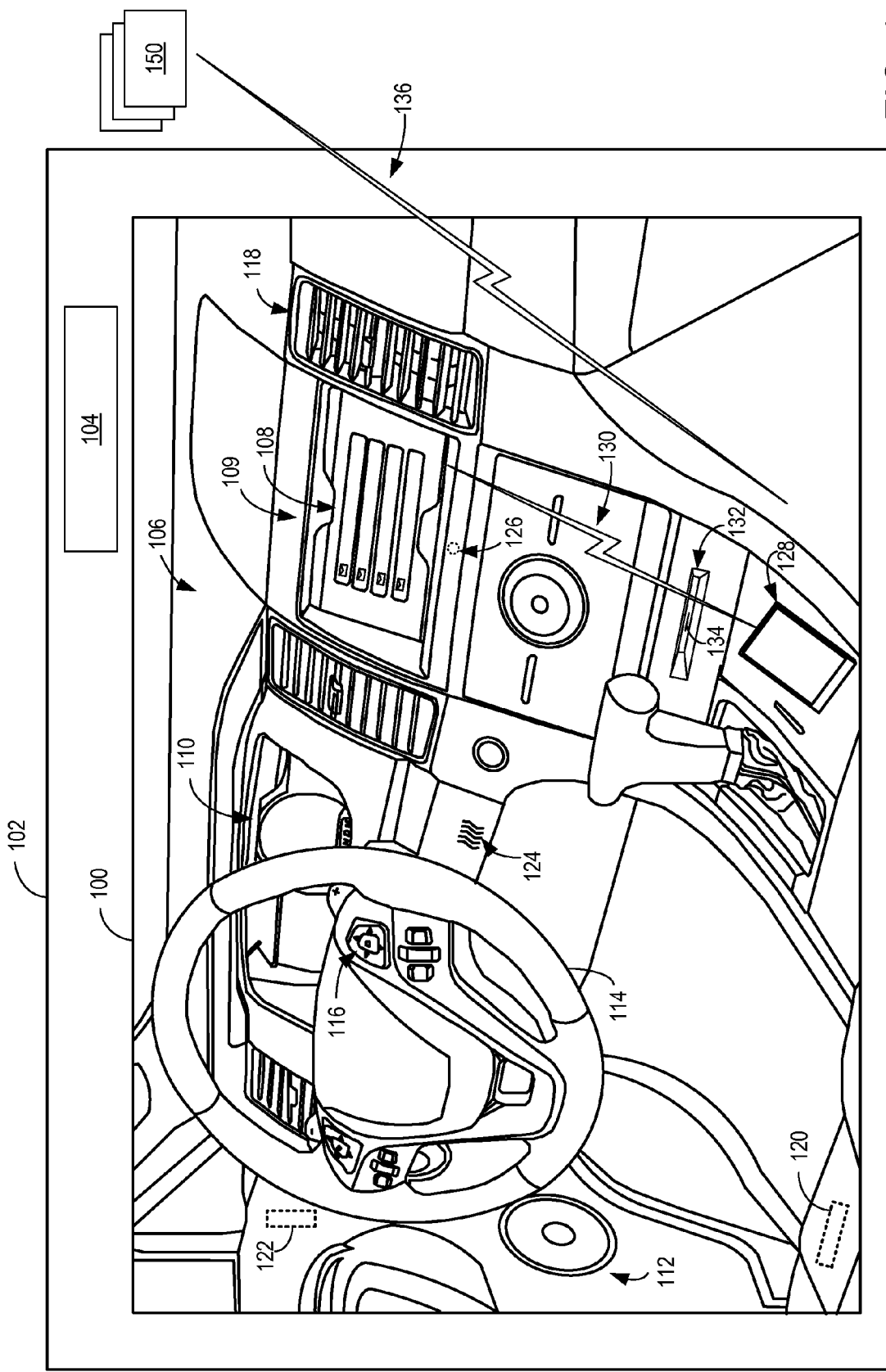
FIG. 1 shows an example partial view of an interior of a cabin of a vehicle in accordance with one or more embodiments of the present disclosure.

FIG. 1 shows an example partial view of one type of environment: an interior of a cabin 100 of a vehicle 102, in which a driver and/or one or more passengers may be seated. Vehicle 102 of FIG. 1 may be a motor vehicle including drive wheels (not shown) and an internal combustion engine 104. Internal combustion engine 104 may include one or more combustion chambers which may receive intake air via an intake passage and exhaust combustion gases via an exhaust passage. Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle.

As shown, an instrument panel 106 may include various displays and controls accessible to a driver (also referred to as the user) of vehicle 102. For example, instrument panel 106 may include a touch screen 108 of an in-vehicle computing system 109 (e.g., an infotainment system), an audio system control panel, and an instrument cluster 110. While the example system shown in FIG. 1 includes audio system controls that may be performed via a user interface of in-vehicle computing system 109, such as touch screen 108 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 112 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system 109 may adjust a radio station selection, a playlist selection, a source of audio input (e.g., from radio or CD or MP3), etc., based on user input received directly via touch screen 108, or based on data regarding the user (such as a physical state and/or environment of the user) received via external devices 150 and/or mobile device 128.

In some embodiments, one or more hardware elements of in-vehicle computing system 109, such as touch screen 108, a display screen, various control dials, knobs and buttons, memory, processor(s), and any interface elements (e.g., connectors or ports) may form an integrated head unit that is installed in instrument panel 106 of the vehicle. The head unit may be fixedly or removably attached in instrument panel 106. In additional or alternative embodiments, one or more hardware elements of the in-vehicle computing system may be modular and may be installed in multiple locations of the vehicle.

Instrument cluster 110 may include various gauges such as a fuel gauge, tachometer, speedometer, and odometer, as well as indicators and warning lights. A steering wheel 114 may project from the instrument panel below instrument cluster 110. Optionally, steering wheel 114 may include controls 116 which may be used in conjunction with touch screen 108 to navigate features of an in-vehicle computing system and to control the in-vehicle computing system. In addition to the components depicted in FIG. 1, it will be appreciated that instrument panel 106 may include additional components such as door and window controls, a cigarette lighter which may also be used as a low-voltage power outlet, a glove compartment, and/or any other suitable elements. In one or more embodiments, control of in-vehicle climate (such as cabin temperature) via climate control system vents 118 may be performed using touch screen 108 and thus no separate climate control interface may be included in instrument panel 106. In alternative embodiments, however, a separate climate control interface may be provided.

The cabin 100 may include one or more sensors for monitoring the vehicle, the user, and/or the environment. For example, the cabin 100 may include one or more seat-mounted pressure sensors 120 configured to measure the pressure applied to the seat to determine the presence of a user. The cabin 100 may include one or more door sensors 122 configured to monitor door activity, such as the opening and/or closing of the door, the locking of the door, the operation of a window of the door, and/or any other suitable door activity event. A humidity sensor 124 may be included to measure the humidity content of the cabin. A microphone 126 may be included to receive user input in the form of voice commands, to enable a user to conduct telephone calls, and/or to measure ambient noise in the cabin 100. It is to be understood that the placement of the sensors illustrated in FIG. 1 is exemplary, and one or more additional or alternative sensors may be positioned in any suitable location of the vehicle. For example, additional sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as from sensors coupled to external devices 150 and/or mobile device 128.

Cabin 100 may also include one or more user objects, such as mobile device 128, that are stored in the vehicle before, during, and/or after travelling. The mobile device may include a smart phone, a tablet, a laptop computer, a portable media player, and/or any suitable mobile computing device. The mobile device 128 may be connected to the in-vehicle computing system via communication link 130. The communication link 130 may be wired (e.g., via Universal Serial Bus [USB], Mobile High-Definition Link [MHL], High-Definition Multimedia Interface [HDMI], etc.) or wireless (e.g., via BLUETOOTH, WI-FI, Near-Field Communication [NFC], cellular connectivity, etc.) and configured to provide two-way communication between the mobile device and the in-vehicle computing system. For example, the communication link 130 may provide sensor and/or control signals from various vehicle systems (such as vehicle audio system, climate control system, etc.) and the touch screen 108 to the mobile device 128 and may provide control and/or display signals from the mobile device 128 to the in-vehicle systems and the touch screen 108. The communication link 130 may also provide power to the mobile device 128 from an in-vehicle power source in order to charge an internal battery of the mobile device.

While the mobile device 128 is illustrated as being spatially separated from the in-vehicle computing system and connected via a substantially external communication link (e.g., a cable or radiofrequency signal), it is to be understood that a slot 132 or other storage structure may be formed in the instrument panel 106 or other location in the vehicle to hold the mobile device in a particular location. The storage structure may include an integrated connector 134 to which the mobile device 128 may be attached or "docked" for providing a substantially internal communication link between the mobile device and the computing system.

In-vehicle computing system 109 may also be communicatively coupled to additional devices operated and/or accessed by the user but located external to vehicle 102, such as one or more external devices 150. In the depicted embodiment, external devices 150 are located outside of vehicle 102 though it will be appreciated that in alternate embodiments, external devices may be located inside cabin 100. The external devices may include a server computing system, personal computing system, portable electronic device, electronic wrist band, electronic head band, portable music player, electronic activity tracking device, pedometer, smart-watch, GPS system, etc. External devices 150 may be connected to the in-vehicle computing system via communication link 136 which may be wired or wireless, as discussed with reference to communication link 130, and configured to provide two-way communication between the external devices and the in-vehicle computing system. For example, external devices 150 may include one or more sensors and communication link 136 may transmit sensor output from external devices 150 to in-vehicle computing system 109 and touch screen 108. External devices 150 may also store and/or receive information regarding contextual data, user behavior/preferences, operating rules, etc. and may transmit such information from the external devices 150 to in-vehicle computing system 109 and touch screen 108.

In-vehicle computing system 109 may analyze the input received from external devices 150, mobile device 128, and/or other input sources and select settings for various in-vehicle systems (such as climate control system or audio system), provide output via touch screen 108 and/or speakers 112, communicate with mobile device 128 and/or external devices 150, and/or perform other actions based on the assessment. In some embodiments, all or a portion of the assessment may be performed by the mobile device 128 and/or the external devices 150.

In some embodiments, one or more of the external devices 150 may be communicatively coupled to in-vehicle computing system 109 indirectly, via mobile device 128 and/or another of the external devices 150. For example, communication link 136 may communicatively couple external devices 150 to mobile device 128 such that output from external devices 150 is relayed to mobile device 128. Data received from external devices 150 may then be aggregated at mobile device 128 with data collected by mobile device 128, the aggregated data then transmitted to in-vehicle computing system 109 and touch screen 108 via communication link 130. Similar data aggregation may occur at a server system and then transmitted to in-vehicle computing system 109 and touch screen 108 via communication link 136/130.

Figure 2:
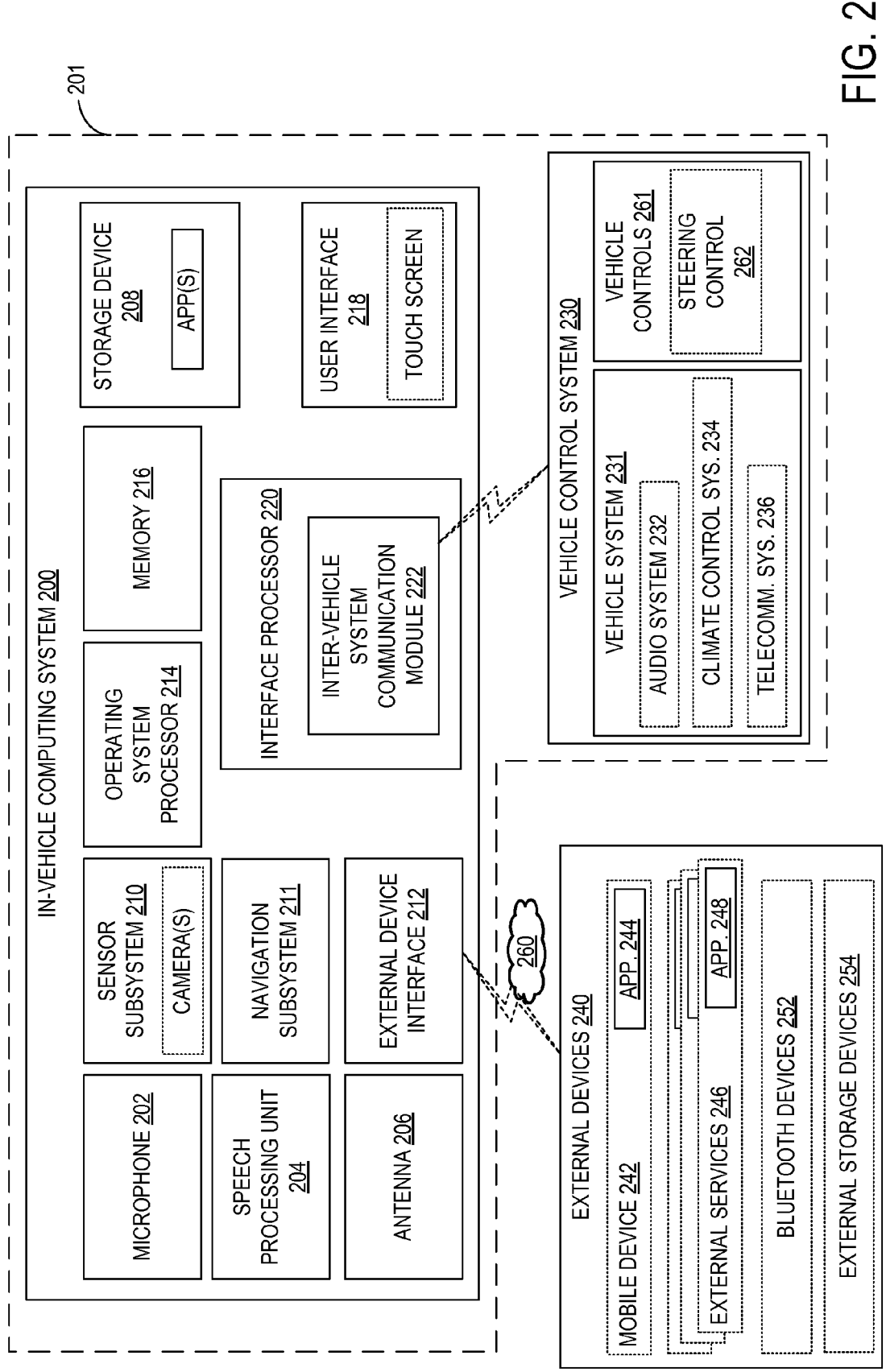
FIG. 2 is a block diagram of an in-vehicle computing system in accordance with one or more embodiments of the present disclosure.

FIG. 2 shows a block diagram of an in-vehicle computing system 200 configured and/or integrated inside vehicle 201. In-vehicle computing system 200 may be an example of in-vehicle computing system 109 of FIG. 1. In some examples, the in-vehicle computing system may be a vehicle infotainment system configured to provide information-based media content (audio and/or visual media content, including entertainment content, navigational services, etc.) to a vehicle user to enhance the operator's in-vehicle experience. The vehicle infotainment system may include, or be coupled to, various vehicle systems, sub-systems, hardware components, as well as software applications and systems that are integrated in, or integratable into, vehicle 201 in order to enhance an in-vehicle experience for a driver and/or a passenger.

In-vehicle computing system 200 may include one or more processors including an operating system processor 214 and an interface processor 220. Operating system processor 214 may execute an operating system on the in-vehicle computing system, and control input/output, display, playback, and other operations of the in-vehicle computing system. Interface processor 220 may interface with a vehicle control system 230 via an inter-vehicle system communication module 222. It is to be understood that both processors 214 and 220 may execute an operating system in some embodiments. Processors 214 and 220 may each be associated with one or more watchdogs or watchdog timers. The watchdogs may monitor operation of various systems and initiate a reboot of the in-vehicle computing device when problematic operation is detected. In some embodiments, the watchdogs may include a watchdog timer that initiates the reboot of the in-vehicle computing device. Processors 214 and 220 may be configured to reset and/or restart the watchdog timers in accordance with a clock signal that ensures resetting and/or restarting of the watchdog timers prior to an expiration of the watchdog timers.

Inter-vehicle system communication module 222 may output data to other vehicle systems 231 and vehicle control elements 261, while also receiving data input from other vehicle components and systems 231, 261, e.g. by way of vehicle control system 230. When outputting data, inter-vehicle system communication module 222 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), digital signals propagated through vehicle data networks (such as an engine controller area network [CAN] bus through which engine related information may be communicated, a climate control CAN bus through which climate control related information may be communicated, and a multimedia data network through which multimedia data is communicated between multimedia components in the vehicle). For example, the in-vehicle computing system may retrieve from the engine CAN bus the current speed of the vehicle estimated by the wheel sensors, a power state of the vehicle via a battery and/or power distribution system of the vehicle, an ignition state of the vehicle, etc. In addition, other interfacing means such as Ethernet may be used as well without departing from the scope of this disclosure.

It is to be understood that the CAN bus may be used to detect car activity or inactivity. For example, the CAN bus may remain active for several minutes to keep the headlights available or to provide delayed lights on select features. The modules may communicate on the CAN bus during user activities such that detection of car activity may be determined though activity on the CAN bus, such as through parameters on the CAN bus sensed from other vehicle systems.

A non-volatile storage device 208 may be included in in-vehicle computing system 200 to store data such as instructions executable by processors 214 and 220 in non-volatile form. The storage device 208 may store application data to enable the in-vehicle computing system 200 to run an application for connecting to a cloud-based server and/or collecting information for transmission to the cloud-based server. The application may retrieve information gathered by vehicle systems/sensors, input devices (e.g., user interface 218), devices in communication with the in-vehicle computing system (e.g., a mobile device connected via a Bluetooth link), etc. In-vehicle computing system 200 may further include a volatile memory 216. Volatile memory 216 may be random access memory (RAM). Non-transitory storage devices, such as non-volatile storage device 208 and/or volatile memory 216, may store instructions and/or code that, when executed by a processor (e.g., operating system processor 214 and/or interface processor 220), controls the in-vehicle computing system 200 to perform one or more of the actions described in the disclosure.

A microphone 202 may be included in the in-vehicle computing system 200 to receive voice commands from a user, to measure ambient noise in the vehicle, to determine whether audio from speakers of the vehicle is tuned in accordance with an acoustic environment of the vehicle, etc. A speech processing unit 204 may process voice commands, such as the voice commands received from the microphone 202. In some embodiments, in-vehicle computing system 200 may also be able to receive voice commands and sample ambient vehicle noise using a microphone included in an audio system 232 of the vehicle.

One or more additional sensors may be included in a sensor subsystem 210 of the in-vehicle computing system 200. For example, the sensor subsystem 210 may include a camera, such as a rear view camera for assisting a user in parking the vehicle and/or a cabin camera for identifying a user (e.g., using facial recognition and/or user gestures). Sensor subsystem 210 of in-vehicle computing system 200 may communicate with and receive inputs from various vehicle sensors and may further receive user inputs. For example, the inputs received by sensor subsystem 210 may include transmission gear position, transmission clutch position, gas pedal input, brake input, transmission selector position, vehicle speed, engine speed, mass airflow through the engine, ambient temperature, intake air temperature, etc., as well as inputs from climate control system sensors (such as heat transfer fluid temperature, antifreeze temperature, fan speed, passenger compartment temperature, desired passenger compartment temperature, ambient humidity, etc.), an audio sensor detecting voice commands issued by a user, a fob sensor receiving commands from and optionally tracking the geographic location/proximity of a fob of the vehicle, etc. While certain vehicle system sensors may communicate with sensor subsystem 210 alone, other sensors may communicate with both sensor subsystem 210 and vehicle control system 230, or may communicate with sensor subsystem 210 indirectly via vehicle control system 230. A navigation subsystem 211 of in-vehicle computing system 200 may generate and/or receive navigation information such as location information (e.g., via a GPS sensor and/or other sensors from sensor subsystem 210), route guidance, traffic information, road construction/detour information, point-of-interest (POI) identification, and/or provide other navigational services for the driver.

External device interface 212 of in-vehicle computing system 200 may be coupleable to and/or communicate with one or more external devices 240 located external to vehicle 201. While the external devices are illustrated as being located external to vehicle 201, it is to be understood that they may be temporarily housed in vehicle 201, such as when the user is operating the external devices while operating vehicle 201. In other words, the external devices 240 are not integral to vehicle 201. The external devices 240 may include a mobile device 242 (e.g., connected via a Bluetooth connection) or an alternate Bluetooth-enabled device 252. Mobile device 242 may be a mobile phone, smart phone, wearable devices/sensors that may communicate with the in-vehicle computing system via wired and/or wireless communication, or other portable electronic device(s). Other external devices include external services 246. For example, the external devices may include extra-vehicular devices that are separate from and located externally to the vehicle. Still other external devices include external storage devices 254, such as solid-state drives, pen drives, USB drives, etc. External devices 240 may communicate with in-vehicle computing system 200 either wirelessly or via connectors without departing from the scope of this disclosure. For example, external devices 240 may communicate with in-vehicle computing system 200 through the external device interface 212 over network 260, a universal serial bus (USB) connection, a direct wired connection, a direct wireless connection, and/or other communication link. The external device interface 212 may provide a communication interface to enable the in-vehicle computing system to communicate with mobile devices associated with contacts of the driver. For example, the external device interface 212 may enable phone calls to be established and/or text messages (e.g., SMS, MMS, etc.) to be sent (e.g., via a cellular communications network) to a mobile device associated with a contact of the driver.

One or more applications 244 may be operable on mobile device 242. As an example, mobile device application 244 may be operated to aggregate user data regarding interactions of the user with the mobile device. For example, mobile device application 244 may aggregate data regarding music playlists listened to by the user on the mobile device, telephone call logs (including a frequency and duration of telephone calls accepted by the user), positional information including locations frequented by the user and an amount of time spent at each location, etc. The collected data may be transferred by application 244 to external device interface 212 over network 260. In addition, specific user data requests may be received at mobile device 242 from in-vehicle computing system 200 via the external device interface 212. The specific data requests may include requests for determining where the user is geographically located, an ambient noise level and/or music genre at the user's location, an ambient weather condition (temperature, humidity, etc.) at the user's location, etc. Mobile device application 244 may send control instructions to components (e.g., microphone, etc.) or other applications (e.g., navigational applications) of mobile device 242 to enable the requested data to be collected on the mobile device. Mobile device application 244 may then relay the collected information back to in-vehicle computing system 200.

Likewise, one or more applications 248 may be operable on external services 246. As an example, external services applications 248 may be operated to aggregate and/or analyze data from multiple data sources. For example, external services applications 248 may aggregate data from one or more social media accounts of the user, data from the in-vehicle computing system (e.g., sensor data, log files, user input, etc.), data from an internet query (e.g., weather data, POI data), etc. The collected data may be transmitted to another device (e.g., a caller's mobile device) and/or analyzed by the application to determine a driver status or determine whether a driver status has changed and perform an action based on the context (e.g., requesting/sending data to other devices).

The external services applications 248 may additionally or alternatively send requests to in-vehicle computing system 200 for data relating to the driver status responsive to a request received from a caller's mobile device. For example, a caller potentially attempting to contact a driver (e.g., a user of in-vehicle computing system 200 and/or mobile device 242) may send a request for a status of the driver prior to establishing a phone call. Responsive to such a request, external services applications 248 may process the request to determine a driver/device identifier and send a request to in-vehicle computing system 200 for a driver status. In some embodiments, a request for a driver status may be sent to the external services application 248 and/or to the in-vehicle computing system 200 via the driver's mobile device 242.

Vehicle control system 230 may include controls for controlling aspects of various vehicle systems 231 involved in different in-vehicle functions. These may include, for example, controlling aspects of vehicle audio system 232 for providing audio entertainment to the vehicle occupants, aspects of climate control system 234 for meeting the cabin cooling or heating needs of the vehicle occupants, as well as aspects of telecommunication system 236 for enabling vehicle occupants to establish telecommunication linkage with others.

Audio system 232 may include one or more acoustic reproduction devices including electromagnetic transducers such as speakers. Vehicle audio system 232 may be passive or active such as by including a power amplifier. In some examples, in-vehicle computing system 200 may be the only audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies.

Climate control system 234 may be configured to provide a comfortable environment within the cabin or passenger compartment of vehicle 201. Climate control system 234 includes components enabling controlled ventilation such as air vents, a heater, an air conditioner, an integrated heater and air-conditioner system, etc. Other components linked to the heating and air-conditioning setup may include a windshield defrosting and defogging system capable of clearing the windshield and a ventilation-air filter for cleaning outside air that enters the passenger compartment through a fresh-air inlet.

Vehicle control system 230 may also include controls for adjusting the settings of various vehicle controls 261 (or vehicle system control elements) related to the engine and/or auxiliary elements within a cabin of the vehicle, such as steering wheel controls 262 (e.g., steering wheel-mounted audio system controls, cruise controls, windshield wiper controls, headlight controls, turn signal controls, etc.), instrument panel controls, microphone(s), accelerator/brake/clutch pedals, a gear shift, door/window controls positioned in a driver or passenger door, seat controls, cabin light controls, audio system controls, cabin temperature controls, etc. The control signals may also control audio output at one or more speakers of the vehicle's audio system 232. For example, the control signals may adjust audio output characteristics such as volume, equalization, audio image (e.g., the configuration of the audio signals to produce audio output that appears to a user to originate from one or more defined locations), audio distribution among a plurality of speakers, etc. Likewise, the control signals may control vents, air conditioner, and/or heater of climate control system 234. For example, the control signals may increase delivery of cooled air to a specific section of the cabin.

Control elements positioned on an outside of a vehicle (e.g., controls for a security system) may also be connected to computing system 200, such as via communication module 222. The control elements of the vehicle control system may be physically and permanently positioned on and/or in the vehicle for receiving user input. In addition to receiving control instructions from in-vehicle computing system 200, vehicle control system 230 may also receive input from one or more external devices 240 operated by the user, such as from mobile device 242. This allows aspects of vehicle systems 231 and vehicle controls 261 to be controlled based on user input received from the external devices 240.

In-vehicle computing system 200 may further include an antenna 206. Antenna 206 is shown as a single antenna, but may comprise one or more antennas in some embodiments. The in-vehicle computing system may obtain broadband wireless internet access via antenna 206, and may further receive broadcast signals such as radio, television, weather, traffic, and the like. The in-vehicle computing system may receive positioning signals such as GPS signals via one or more antennas 206. The in-vehicle computing system may also receive wireless commands via RF such as via antenna(s) 206 or via infrared or other means through appropriate receiving devices. In some embodiments, antenna 206 may be included as part of audio system 232 or telecommunication system 236. Additionally, antenna 206 may provide AM/FM radio signals to external devices 240 (such as to mobile device 242) via external device interface 212.

One or more elements of the in-vehicle computing system 200 may be controlled by a user via user interface 218. User interface 218 may include a graphical user interface presented on a touch screen, such as touch screen 108 of FIG. 1, and/or user-actuated buttons, switches, knobs, dials, sliders, etc. For example, user-actuated elements may include steering wheel controls, door and/or window controls, instrument panel controls, audio system settings, climate control system settings, and the like. A user may also interact with one or more applications of the in-vehicle computing system 200 and mobile device 242 via user interface 218. In addition to receiving a user's vehicle setting preferences on user interface 218, vehicle settings selected by in-vehicle control system may be displayed to a user on user interface 218. Notifications and other messages (e.g., received messages), as well as navigational assistance, may be displayed to the user on a display of the user interface. User preferences/information and/or responses to presented messages may be performed via user input to the user interface.

Figure 3:
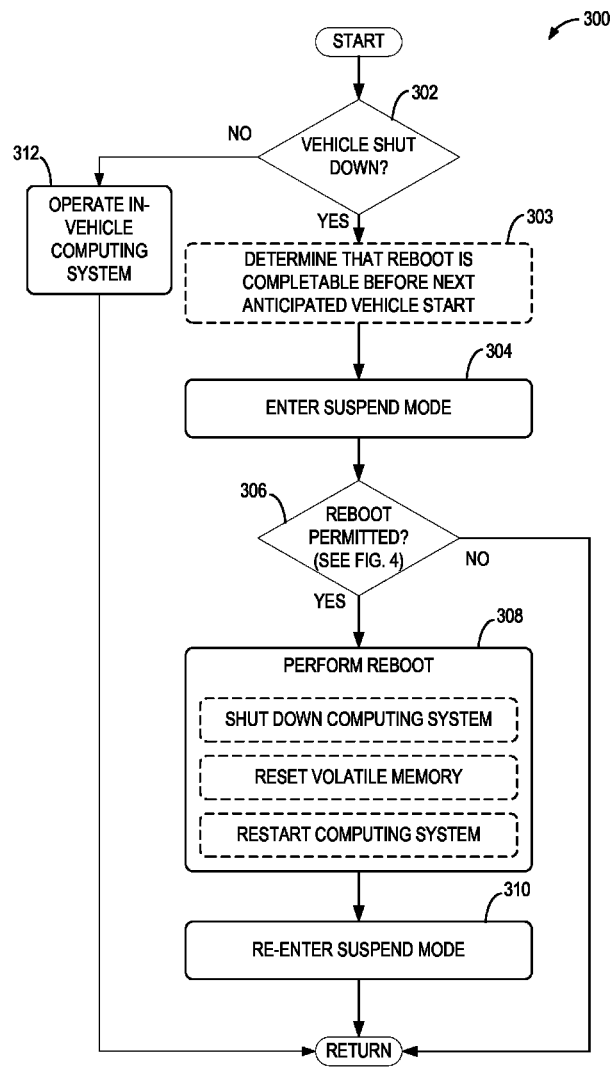
FIG. 3 is a flow chart for a method of controlling power modes of an in-vehicle computing system upon detection of a vehicle system shut down event in accordance with one or more embodiments of the present disclosure.

FIG. 3 is a flow chart of a method 300 for controlling an in-vehicle computing system upon detection of a vehicle system shut down event. Method 300 may be performed by an in-vehicle computing system, such as in-vehicle computing system 200 of FIG. 2, responsive to vehicle operating conditions (e.g. based on data input from vehicle control system 230).

At 302, method 300 includes determining whether vehicle shut down conditions are present. For example, this may include determining whether a vehicle shut down has occurred without a subsequent vehicle start, whether a vehicle shut down is in progress, or whether a vehicle shut down is imminent. In one or more embodiments, a determination of whether vehicle system shut down conditions are present and/or a detection of whether the vehicle is shut down may be performed on an interrupt basis, whereas in other embodiments, the determination/detection may be performed intermittently or via polling. The determination/detection may be based on sensed parameter values such as ignition state, whether a vehicle on/off button has been pressed, engine speed, voltage levels, etc. For example, in non-hybrid vehicle embodiments, the in-vehicle computing system may communicate with the vehicle control system to determine whether ignition state indicates a key-off or key-on position (e.g., via polling or on an interrupt basis). Alternatively, the determination/detection may be made based on parameter values sensed by sensors such as sensors of sensor subsystem 210 of in-vehicle computing system 200.

If the answer at 302 is NO, indicating that the vehicle is operating, method 300 proceeds to 312. At 312, method 300 includes operating the in-vehicle computing system. Operation of the in-vehicle computing system may encompass normal operation of an in-vehicle computing system such as in-vehicle computing system 200 of FIG. 2, and may be referred to as "running mode" operation. During running mode operation, the in-vehicle computing system may be in a powered state such that a user of the vehicle may control various vehicle systems such as a climate control system, audio system, navigation system, etc. via a touch screen or other user interface of the in-vehicle computing system. After 312, method 300 returns to start.

Otherwise, if the answer at 302 is YES, method 300 optionally proceeds to 303 to determine that the reboot may be completed before the next anticipated vehicle start. For example, the determination that a reboot may be completed before a next anticipated vehicle start may include determining whether a predetermined duration has elapsed since the vehicle was shut down, for example, and the reboot may only be performed without any user input only if it is determined that the reboot is able to be completed before the next vehicle start. In one example, determining whether a reboot may be completed before a next anticipated vehicle start may include estimating a time of a next anticipated vehicle start and determining whether a reboot is completable, or not, before the next anticipated vehicle start. Determining whether the reboot is completable or not may include monitoring vehicle operating conditions including a past history of vehicle on and off durations relative to a real-time clock representing actual time of day for a time zone in which the vehicle is located, the time zone based on a global positioning system of the vehicle. In some examples, if the reboot is not completable before a next anticipated vehicle start, the reboot may not be performed and/or the suspend mode may not be entered.

Upon determining that the reboot is completable before a next anticipated vehicle start, the method proceeds to 304 where the in-vehicle computing system enters a suspend mode. It is to be understood that entering the suspend mode may include the in-vehicle computing system remaining in the suspend mode, if the system is already operating in the suspend mode. As described above, the suspend mode of the in-vehicle computing system may be a mode in which the volatile memory is kept in a standby state while other system components such as processor(s), non-volatile memory, etc. are powered off or put in a low power state.

After 304, method 300 proceeds to 306. At 306, method 300 includes determining whether a reboot of the in-vehicle computing system may be performed. For example, the in-vehicle computing system may include two processors, as described above with respect to FIG. 2. Accordingly, one processor may be powered off or put in a low power state in the suspend mode, while the other processor may operate in a full or reduced-power mode in order to be able to determine whether a reboot of the in-vehicle computing system may be performed. In some embodiments, the determination of the reboot may be performed by another system/processor that provides a control signal to one or more of the processors to trigger the reboot. The determination may include determining whether a reboot of the in-vehicle computing system may be performed before a next anticipated vehicle restart. In one or more embodiments, the determination may be made in accordance with the method of FIG. 4, which is described below.

If it is determined at 306 that a reboot may not be performed and/or is not permitted, method 300 returns to start. Otherwise, if a reboot is permitted, method 300 proceeds to 308 to perform a reboot of the in-vehicle computing system. Performing a reboot may include performing one or more steps in sequence such as shutting down the in-vehicle computing system, then resetting volatile memory (e.g., memory 216 of FIG. 2), and then restarting the in-vehicle computing system. Upon completing the reboot at 308, the system may re-enter the suspend mode, as indicated at 310, and return to start.

Figure 4:
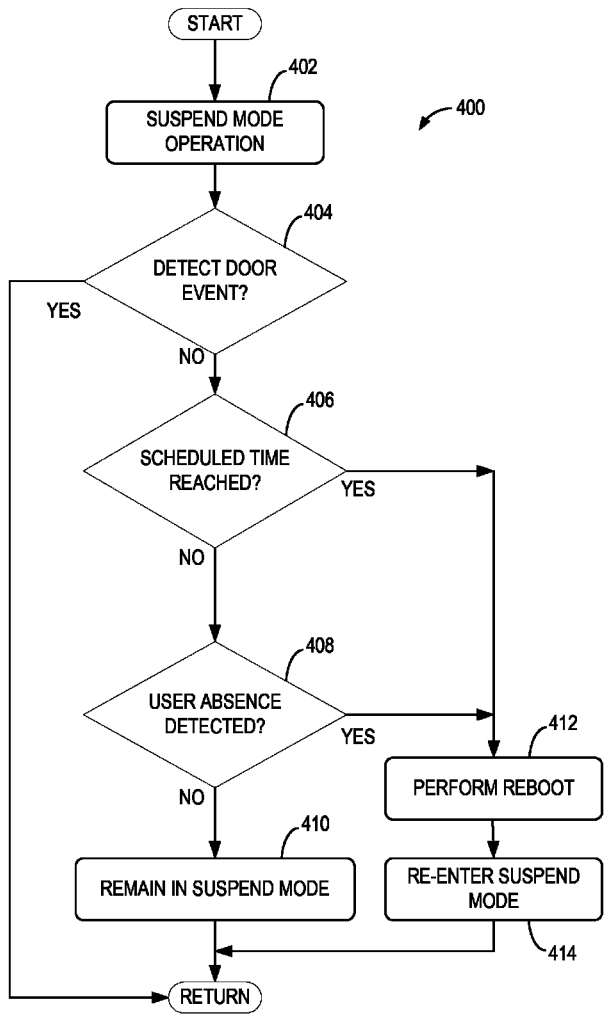
FIG. 4 is a flow chart for a method of identifying whether a reboot of an in-vehicle computing system may be performed, in accordance with one or more embodiments of the present disclosure.

FIG. 4 is a flow chart for a method 400 for determining whether a reboot of the in-vehicle computing system may be performed, in accordance with one or more embodiments of the present disclosure. Method 400 may be performed by an in-vehicle computing system, such as in-vehicle computing system 200 of FIG. 2, in conjunction with the method of FIG. 3 (e.g., method 400 may be performed at step 306 of method 300).

At 402, method 400 includes operating the in-vehicle computing system in suspend mode, for example in the manner described above for step 304 of method 300. While operating in the suspend mode (e.g., at 402), the method 400 proceeds to 404. At 404, method 400 includes detecting a door event. A door event may include opening of a vehicle door followed by closing of the same vehicle door, for example a driver door of the vehicle, and may include any opening or be limited to sustained openings (e.g., openings of a duration greater than a threshold duration, to reduce "false positives" such as a driver opening the driver door very quickly to release a seat belt strap caught in the door). Opening of a driver door of the vehicle may serve as an indicator that the vehicle is or will soon be unoccupied. Further examples of door events may include actuation of locks of one or more doors of the vehicle. For example, the in-vehicle computing system may communicate with the vehicle controller either via polling or on an interrupt basis to determine whether one or more vehicle doors have been unlocked, then opened (e.g., for a duration greater than a threshold), and then closed (or closed then locked). Accordingly, detection of a door event may include detection of a predetermined sequence of events related to the locking/unlocking/opening/closing of one or more vehicle doors.

In some embodiments, detection of a door event may refer to detection of an event associated with a vehicle's front driver side door specifically, or may include detection of door events concerning any or all vehicle doors. Additionally or alternatively, door events may include events relating to windows disposed on doors of the vehicle. For example, a door event may be detected when windows disposed on one or more doors of the vehicle are rolled up or down (e.g., when a user commands the in-vehicle computing system via a user interface such as a touch screen, remote buttons, etc. or via a voice command to roll up/roll down one or more windows of the vehicle). In one or more embodiments, the in-vehicle computing system may differentiate between window roll-up events which are related to climate control (e.g., a user rolling up a window and then activating the climate control system within a predetermined duration after rolling up the window) and window roll-up events which are related to a user's imminent exit from the vehicle (e.g., window roll-up events occurring while vehicle speed is below a threshold, or occurring during or after vehicle maneuvers which the vehicle controller and/or in-vehicle computing system identify as being correlated to parking of the vehicle).

Thus, in some embodiments, if the answer at 404 is YES, then such an answer may indicate that a user is present in the vehicle and a reboot and/or suspend may not be performed. Accordingly, if the answer at 404 is YES, method 400 may return to start. It should be appreciated that in other embodiments, an answer of YES at 404 may, in combination with other factors, result in triggering the performance of a reboot as shown at 412 and described in more detail below in regards to YES answers for steps 406 and 408.

If the answer at 404 is NO, indicating that a door event has not been detected, method 400 proceeds to 406. At 406, method 400 includes determining whether a scheduled time has been reached. In one or more embodiments, the in-vehicle computing system may be rebooted at a scheduled time. The scheduled time may be a static time of the day/week/month, etc. (e.g., 3:00 AM every Wednesday). In other examples, the scheduled time may vary, for example based on adaptive learning of vehicle use patterns. In such examples, various adaptive learning algorithms or methodologies may be employed by the in-vehicle computing system to determine an appropriate time for rebooting of the in-vehicle computing system. In this context, an appropriate time may be a time when vehicle users are least likely to be occupying the vehicle based on usage data available to the in-vehicle computing system, or based on average vehicle usage data programmed by the computing system manufacturer (e.g., based on aggregated data from the use of one or more other vehicles). For example, the in-vehicle computing system may communicate with the vehicle controller to access data related to vehicle usage, and may determine an appropriate time for reboot based on this data (e.g., data from the vehicle controller may indicate that a vehicle start has occurred between 3:00 AM and 4:00 AM in only 2% of recorded vehicle starts, and based on this data the in-vehicle computing system may set a scheduled time of 3:30 AM every one, two, three, or more days for rebooting of the in-vehicle computing system.

In still further examples, a user of the vehicle may have the option of setting the scheduled time, e.g. via a user interface of the in-vehicle computing system. This may include a user setting the scheduled time during a one-time initialization of the in-vehicle computing system (e.g., during a customization procedure performed shortly after purchase of the vehicle), or at another time (e.g., by navigating to a menu listing customizable settings). Alternatively, vehicle users may be prompted to vary the scheduled time intermittently (e.g., every 2 months) or when the in-vehicle computing system has determined that a pre-set or adaptively learned scheduled time is unsatisfactory (e.g., the vehicle is operating on one or more occasions when the scheduled time arrives). The foresight of a vehicle user with regard to future vehicle usage patterns may thus be utilized to reduce the likelihood of the scheduled time coinciding with vehicle operation.

If the answer at 406 is NO, indicating that a scheduled time has not been reached, method 400 proceeds to 408. At 408, method 400 includes detecting the absence of a vehicle user. In some examples, the absence of a vehicle user may be detected based on signals received from one or more sensors of the sensor subsystem of the in-vehicle computing system. For example, detection of a vehicle user may be determined from a vehicle CAN bus which may be used to detect activity or inactivity. The communication from the CAN bus may enable monitoring of car activity instead of individual features or functions. For example, the CAN bus supporting the delayed light features may remain active for a period of time after vehicle shut down to support the delayed light feature. Such detection of operation of the CAN bus may be used to detect the absence of a vehicle user.

Further, as another example, signals may be received from one or more sensors of the sensor subsystem of the in-vehicle computing system, such as one or more seat occupancy sensors (e.g., a driver seat pressure/occupancy sensor), motion sensors (e.g., sensing motion indicative of vehicle occupancy), humidity sensors (e.g., detecting humidity changes indicative of vehicle occupancy changes), temperature sensors, ambient noise sensors, and the like. For instance, when a level of ambient noise is below a threshold for a predetermined duration as determined by the in-vehicle computing system based on data received from one or more ambient noise sensors, the in-vehicle computing system may determine that absence of a vehicle user or users is likely.

In other examples, vehicle occupancy may be detected based on signals received wirelessly from a key fob and/or from one or more mobile devices associated with vehicle users. That is, in some embodiments, a key fob may be used by the vehicle's driver to lock/unlock doors, activate alarms, etc. wirelessly from a remote location. The in-vehicle computing system may be capable of detecting the proximity of the key fob, and this information may be used in conjunction with other data such as locked/unlocked state of vehicle doors, etc. to detect the absence of a vehicle user. For example, if a vehicle user has locked the vehicle using the key fob and set a vehicle alarm with the key fob (e.g., an alarm which will be activated if the vehicle is tampered with), this may be indicate that a prolonged absence of the user from the vehicle is imminent. Further, as the proximity of the key fob to the vehicle decreases, the likelihood of a prolonged absence of the user from the vehicle may increase, as the user may need to traverse a longer distance to return to the vehicle even if the stopover is relatively short.

Similarly, the in-vehicle computing system may be configured to communicate wirelessly with a mobile device belonging to the vehicle user in some examples. Accordingly, GPS or similar features may be utilized by the in-vehicle computing system to determine the proximity of the user from vehicle. An accelerometer of the mobile device may be used to analyze the user's movements to aid in an assessment of whether the user's return to the vehicle is imminent. In some examples, permissions between one or more mobile devices of the user and the in-vehicle computing system may permit exchange of data such as Internet browsing data, email account data, calendar data, etc. to assess whether the user's schedule indicates a likely absence from the vehicle for a time period long enough to perform a reboot of the in-vehicle computing system. For example, the user may have performed an Internet search for movie times, clicked on a website listing a movie showing at a particular theater, and purchased tickets online. After the vehicle has been parked at the movie theater, the in-vehicle computing system may determine that a prolonged user absence from the vehicle is likely based on the Internet browsing data and subsequent trip terminating at the movie theater. Alternatively, the in-vehicle computing system may record how long the vehicle remains at a given geographic location and may aggregate such data for use in determining an average visit time for that location. On subsequent vehicle trips to the location, the average visit time may be a factor in determining whether a reboot of the in-vehicle computing system is appropriate.

In further examples, communication between the in-vehicle computing system and one or more mobile devices of the user may be possible, and may be useful in determining an absence of a user from the vehicle. For instance, after a predetermined duration has elapsed since the ignition was turned off, if reboot of the in-vehicle computing system is urgently needed and if the user has enabled such functionality, the in-vehicle computing system may send a text message to the user requesting confirmation that the user's absence from the vehicle will last for a predetermined duration or longer. The user may then respond to the text message to either confirm a prolonged absence, or indicate an imminent return to the vehicle. If the answer at 408 is NO, indicating that absence of a user from the vehicle has not been detected, method 400 proceeds to 410 to continue operating the in-vehicle computing system in suspend mode (e.g., without rebooting the in-vehicle computing system). After 410, method 400 returns to start.

Otherwise, if the answer at 406 or 408 is YES, method 400 proceeds to 412 to perform a reboot of the in-vehicle computing system. For example, positive determinations at 406 and 408 may indicate that a reboot may be performed without compromising user experience, e.g. as the user may be absent from the vehicle and/or the vehicle may be in an unpowered state (e.g., the vehicle may be shut down) for a length of time exceeding a length of time required to reboot the in-vehicle computing system.

As described above, in some examples, a reboot of the in-vehicle computing system may involve powering down (e.g., providing no current to) the entire system or substantially the entire system. Alternatively, a reboot of the in-vehicle computing system may include completely powering down volatile memory (e.g., RAM) and subsequently powering up the volatile memory while continuing to supply power to other system components (e.g., a user interface and non-volatile memory of the in-vehicle computing system may continue to receive power and may display a message on the user interface indicating the unavailability of certain functions of the in-vehicle computing system during the reboot).

In some examples, if the reboot is initiated and user activity is unexpectedly engaged, the system may provide a notification to the user. The notification may be a message presented through a user interface or HMI screen and may be a visual, audio, or combination message. For example, the notification may provide information to the user regarding an update or maintenance activity and may provide a request for the user to wait to initiate further user activity. In some examples, a time period may be provided to the user regarding the period of reboot.

After performing the reboot at 412, method 400 proceeds to 414. At 414, method 400 includes placing the in-vehicle computing system in suspend mode (e.g., re-entering suspend mode). As described above, the suspend mode of the in-vehicle computing system may be a mode in which the volatile memory is kept in a standby state (e.g., at least some current may be supplied to the volatile memory) while other system components such as processor(s), non-volatile memory, etc. are powered off.

One or more of steps 402 through 414 of FIG. 4 may be performed in various orders and at different points within the method 400 or as a separate method outside of method 400. For example, one or more of steps 402 through 414 may be performed when a number of accumulated errors exceeds a threshold, or based on another performance-related metric of the in-vehicle computing system. Further, in some embodiments, one or more of steps 402 through 414 may be omitted or repeated, and/or additional steps may be added. For example, one or more of steps 402 through 414 may be bypassed and/or overruled based on other vehicle operating conditions.

Figure 5:
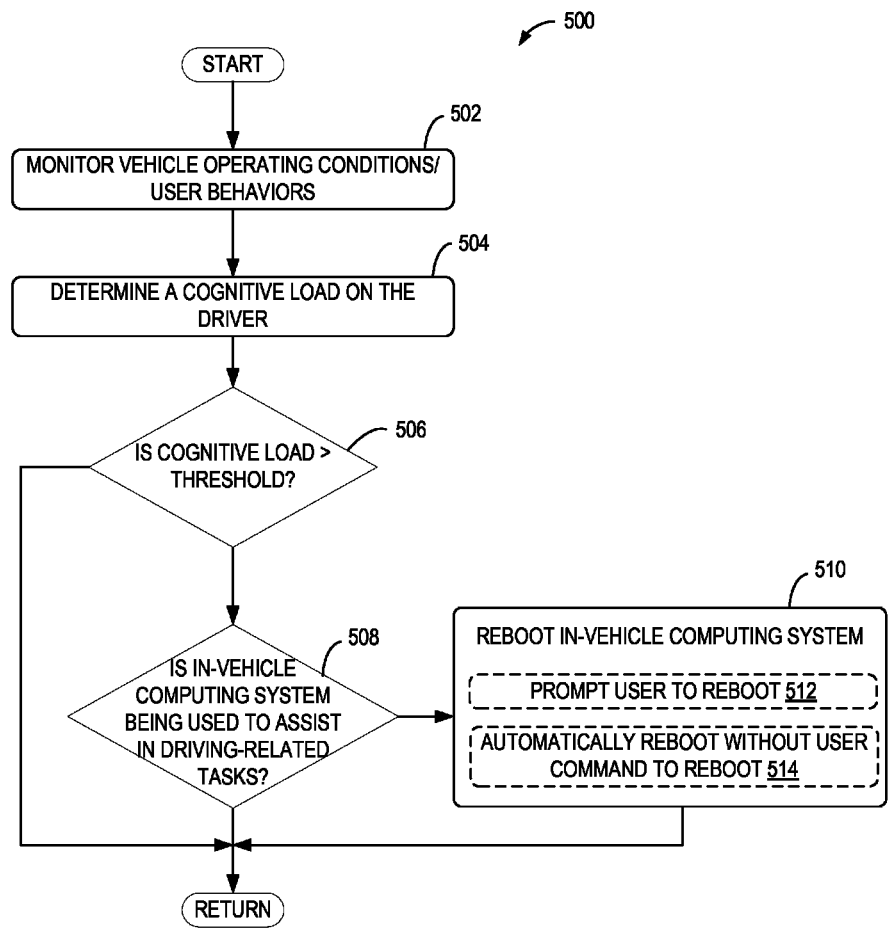
FIG. 5 is an example method for selectively rebooting an in-vehicle computing system based on a cognitive load of a driver, in accordance with one or more embodiments of the present disclosure.

It will be appreciated that in contrast to the methods of FIGS. 3 and 4 in which the in-vehicle computing system is rebooted at times which may be chosen to minimize downtime experienced by vehicle users (e.g., while the in-vehicle computing system is in a suspend mode), other rebooting approaches are within the scope of the present disclosure. For example, in some alternative embodiments, the in-vehicle computing system may "train" vehicle users to reduce distraction while driving by rebooting the system as a consequence when excess distraction is detected, e.g. while displaying a chastising message to the user. FIG. 5 is an example method 500 for selectively rebooting an in-vehicle computing system, such as in-vehicle computing system 200 of FIG. 2, based on a cognitive load of a driver. At 502, the method includes monitoring vehicle operating conditions and/or user behaviors associated with users in the vehicle. Based on this information, the in-vehicle computing system may assess a level of driver distraction (e.g., based on a frequency of issuance of commands via the user interface, or via other processes, such as motion sensing or eye movement sensing). At 504, the method includes determining a cognitive load on the driver. If the in-vehicle computing system determines that the user/driver is not paying adequate attention to the road, the system may induce a temporary "blackout" of the distracting features of the in-vehicle computing system while simultaneously performing a reboot, reducing errors which may have accumulated since the last reboot. Accordingly, at 506, the method includes determining if the cognitive load is greater than a threshold.

If the cognitive load is not above the threshold (e.g., "NO" at 506), the method returns without rebooting. If the cognitive load is above the threshold (e.g., "YES" at 506), the method proceeds to 508 to determine if the in-vehicle computing system is being used to assist in driving-related tasks. For example, driving-related tasks may include navigational functions, vehicle system governance, etc. Non-driving-related tasks may include radio functions, air conditioning, phone calls, etc. If the in-vehicle computing system is being used for driving-related tasks (e.g., "YES" at 508), shutting down the in-vehicle computing system may cause further distraction/disruption for the driver, so the method returns without rebooting the in-vehicle computing system. If the in-vehicle computing system is not being used for driving-related tasks (e.g., "NO" at 508), the method proceeds to 510 to reboot the in-vehicle computing system. As indicated at 512, rebooting the system may include prompting a user to reboot (e.g., not rebooting until user input is received that commands the system to reboot). Alternatively, the system may automatically reboot without a user command to perform the reboot, as indicated at 514.

In other examples, when the in-vehicle computing system is being used to listen to a radio broadcast or perform other non-driving/safety related functions and other features requiring the use of volatile memory such as navigation are not in use, the system may opt to reboot when a disruption in the function(s) occurs (e.g., a song known to be a song disliked by vehicle occupants is played on the radio, the display/system malfunctions, a user turns off one or more functions/turns down a volume level, etc.). Upon detection of the disruption, the in-vehicle computing system may suggest to the user that a reboot may be performed if desired. If a reboot is not desired, the in-vehicle computing system may alternatively suggest remedies for the disruption (e.g., changing the radio station to avoid the disliked song, lowering a brightness of the display, etc.).

As yet another example, the in-vehicle computing system may detect an upcoming radio signal obstruction such as a long tunnel, and suggest to the user prior to entering the tunnel that a reboot be performed upon entering the tunnel (e.g., if other crucial features requiring full functionality of the in-vehicle computing system such as navigation, phone operation, and/or climate control are not currently in use). In such examples, to encourage vehicle users to agree to a reboot, user-friendly animations and/our sounds may be used after a reboot, e.g. animations and/or sounds which may increase a vehicle user's ability to empathize with the need of a personified in-vehicle computing system for rebooting/refreshing and which may serve as an incentive to vehicle users to allow rebooting to occur. However, alternatively, it may be possible to reduce vehicle user involvement with rebooting of the in-vehicle computing system, for example by automatically performing all rebooting based on (e.g., based only on) determinations made by the in-vehicle computing system and/or vehicle control system, without user input. In this way, a reboot may be performed automatically responsive to determinations by the in-vehicle computing system, vehicle control system, and/or other suitable local or remotely located computing systems, without receiving an instruction from the user to perform the reboot.

Figure 6:
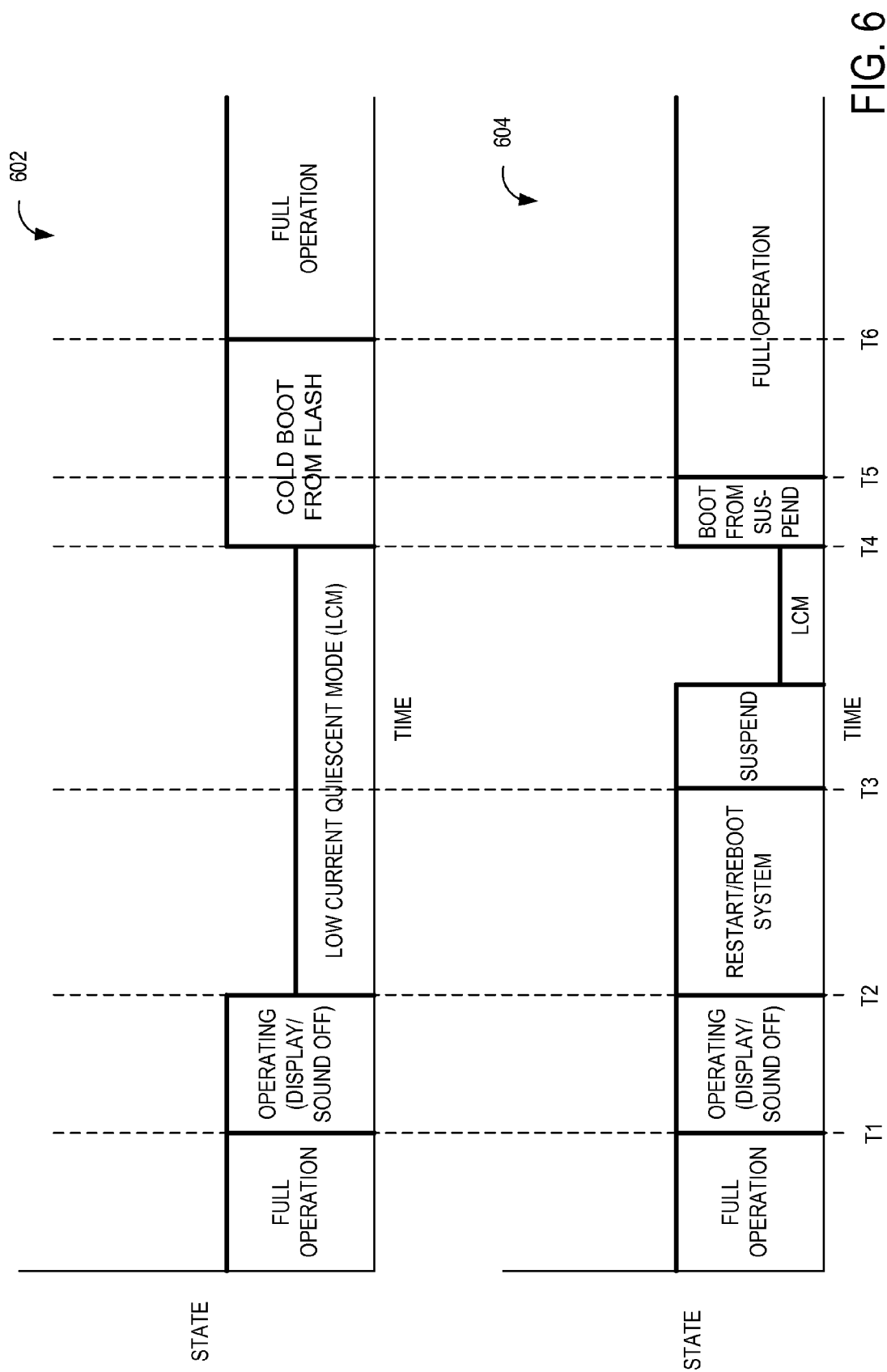
FIG. 6 shows example state diagrams for systems that perform a cold boot at vehicle start up and systems that boot from a suspend state at vehicle start up in accordance with one or more embodiments of the present disclosure.

FIG. 6 shows example state diagrams for in-vehicle computing systems. State diagram 602 illustrates states for systems that perform a cold boot at vehicle start up, while state diagram 604 illustrates states for systems that boot from a suspend state at vehicle start up (e.g., the systems described above). At time T1 for each system, the state of the system switches from fully operating, to operating with limited functionality (e.g., with display/sound off). For example, at time T1, a key off/ignition off event may occur. In response to shutting down the vehicle, each of the in-vehicle computing systems may prepare to be shut down. The limited functionality may be present for approximately 20 minutes in some embodiments in order to accommodate short vehicle shut downs (e.g., a user may shut down the vehicle to quickly run an errand and renter/restart the vehicle a short time later). At time T2, the cold boot system operating in accordance with state diagram 602 switches to a low current quiescent mode and/or shuts down. In contrast, at time T2, the suspend/selective reboot system operating in accordance with state diagram 604 (e.g., operating in accordance with one or more embodiments of the present disclosure) restarts and/or reboots to flush the cached memory and any associated errors that may have built up since a last restart. For example, the reboot may last approximately 45 seconds in some embodiments. After rebooting, the system enters a suspend mode at time T3, in which the machine state and/or other data for subsequent quick startups is stored in non-volatile memory. After storing the data, the suspend/selective reboot system enters a low current quiescent mode.

At time T4, an event (e.g., a key on event, a door open event, etc.) indicating an imminent start up of the vehicle occurs, triggering a cold boot from flash in the cold boot system and a quick boot from suspend in the suspend/selective reboot system. As the cold boot from flash takes longer than the boot from suspend (e.g., approximately 45 seconds versus approximately 2 to 5 seconds), the suspend/selective reboot system may enter full operational mode at time T5. The cold boot system may enter full operational mode later, at time T6 (e.g., upon completion of the cold boot).

Accordingly, the present disclosure provides systems and methods for suspending an in-vehicle computing system to enable quick rebooting and selectively rebooting the in-vehicle computing system while the system is not being used in order to clear any errors that may build up over time. Failure to reboot regularly may result in the build up of errors that may ultimately hinder operation of the in-vehicle computing system, forcing the system to reboot at inopportune times. In this way, systems operating in accordance with the present disclosure may boot up more quickly and have more stable operation than other systems.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the in-vehicle computing system 109/200 and/or vehicle control system 230 described with reference to FIGS. 1 and 2. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed. The following claims particularly point out subject matter from the above disclosure that is regarded as novel and non-obvious.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The invention claimed is:

1. A method for an in-vehicle computing system, comprising:
while the vehicle is shut down,
operating the system in a suspend mode with volatile memory on standby;
determining whether a reboot may be completed before a next anticipated vehicle start; and
if it is determined that a reboot may be completed before the next anticipated vehicle start, performing a reboot of the system.

2. The method of claim 1, further comprising, if it is determined that a reboot may not be completed before the next anticipated vehicle start, continuing to operate the system in the suspend mode, wherein the system transitions from a running mode to the suspend mode responsive to a vehicle shut down operation.

3. The method of claim 1, wherein the determination of whether a reboot may be completed before a next anticipated vehicle start comprises determining whether a predetermined duration has elapsed since vehicle shut down, and wherein the reboot is performed without any user input only if it is determined that the reboot may be completed before the next anticipated vehicle start.

4. The method of claim 1, wherein the determination of whether a reboot may be completed before a next anticipated vehicle start is based on whether a current time matches a scheduled time.

5. The method of claim 1, wherein the determination of whether a reboot may be completed before a next anticipated vehicle start is based on detection of absence of users from the vehicle.

6. The method of claim 1, wherein performing a reboot comprises supplying power from a vehicle power supply to the in-vehicle computing system.

7. A method for an in-vehicle computing system of a vehicle, comprising:
   in a first mode, after a vehicle shut down, operating the system in a suspend mode and rebooting the system at a next vehicle start, without any reboots during the vehicle shut down;
   in a second mode, after the vehicle shut down and before a next vehicle start, operating the system in the suspend mode, then rebooting the system while the vehicle is shut down, then operating the system in the suspend mode again until the next vehicle start.

8. The method of claim 7, further comprising estimating a timing of the next vehicle start, comparing the timing of the next vehicle start to a reboot duration, and determining whether to operate in the first mode or the second mode based on the comparison, the method further comprising, in the second mode, operating the system in a running operating mode directly from the suspend mode.

9. The method of claim 8, wherein the estimation of the timing of the next vehicle start is based on sensed parameter values.

10. The method of claim 8, wherein the estimation of the timing of the next vehicle start is based on information received wirelessly from one or more external devices.

11. The method of claim 8, wherein the estimation of the timing of the next vehicle start is based on a vehicle door event.

12. A vehicle system of a vehicle, the vehicle system comprising:
   an in-vehicle computing system having a first processor and a second processor, the first processor executing an operating system and the second processor interfacing with a vehicle control system; and
   computer readable memory storing instructions executable by the first processor to:
      operate the in-vehicle computing system in a suspend mode with volatile memory on standby while the vehicle is shut down;
      determine whether a reboot is completable before a selected event; and
      if it is determined that a reboot is completable before the selected event, performing a reboot of the in-vehicle computing system.

13. The vehicle system of claim 12, wherein determining whether the reboot is completable includes monitoring vehicle operating conditions including a past history of vehicle on and off durations relative to a real-time clock representing actual time of day for a time zone in which the vehicle is located, the time zone based on a global positioning system of the vehicle.

14. The vehicle system of claim 12, wherein the reboot includes waking up the in-vehicle computing system and then performing the reboot.

15. The vehicle system of claim 12, wherein the system is operated in the suspend mode responsive to determining that a reboot is not completable before the selected event.

16. A method for an in-vehicle infotainment system of a vehicle, comprising:
   in response to initiation of a vehicle shut down, suspending operation of the infotainment system while maintaining volatile memory on standby; and
   after the vehicle is fully shut down and while it remains off, selectively rebooting the infotainment system based on one or more vehicle state parameters.

17. The method of claim 16, wherein the one or more vehicle state parameters includes whether the vehicle is occupied.

18. The method of claim 16, wherein the one or more vehicle state parameters includes a duration since the shut down, but before an expected vehicle on time.

19. The method of claim 16, wherein the selective rebooting includes not rebooting during a first vehicle state, and rebooting with the vehicle still off during a second, different, vehicle state.

20. The method of claim 16, wherein the reboot is a cold reboot.

* * * * *